US006945486B2

(12) United States Patent
Teng (10) Patent No.: US 6,945,486 B2
(45) Date of Patent: Sep. 20, 2005

(54) ROTARY KITCHEN GARLIC TOOL

(76) Inventor: Eric Y. Teng, 12089 Gold Pointe La., Gold River, CA (US) 95670

( * ) Notice: Subject to any disclaimer, the term of this patent is extended or adjusted under 35 U.S.C. 154(b) by 0 days.

(21) Appl. No.: 09/949,310

(22) Filed: Sep. 7, 2001

(65) Prior Publication Data

US 2003/0015611 A1 Jan. 23, 2003

Related U.S. Application Data

(60) Provisional application No. 60/304,901, filed on Jul. 11, 2001.

(51) Int. Cl.[7] .................................................. A47J 43/25
(52) U.S. Cl. ................... 241/169.1; 241/169.2; 241/273.2
(58) Field of Search ................................ 241/162, 164, 241/169.1, 169.2, 273.2

(56) References Cited

U.S. PATENT DOCUMENTS 795,746 A * 7/1905 Wingfield et al. ....... 241/169.1
3,581,790 A * 6/1971 Del Conte ............... 241/169.1

* cited by examiner

Primary Examiner—Mark Rosenbaum (57) ABSTRACT

In accordance with the present invention an innovative garlic tool consists of a set of two disc-shaped presser units having respective male and female rotary grating means comprising a row of protruding grater elements each. Unpeeled garlic cloves are placed between the rotary grating means whereby they are peeled, pressed, and grated by hand-applied counter-twisting force. Processing can be precisely controlled by continuous visual monitoring and repeated grating to achieve optimal bit size and texture. This device is truly remarkable in its complete functionality, and in its simple, compact, and elegant two piece form-follows-function design.

18 Claims, 5 Drawing Sheets

ROTARY KITCHEN GARLIC TOOL

CROSS REFERENCE TO RELATED APPLICATIONS

This application is entitled to the benefit of a document disclosure filed on Feb. 8, 2000 ref. No. 468841 and also entitled to the benefit of a Provisional Patent Application Ser. No. 60/304,901 on the same invention filed on Jul. 11, 2001.

BACKGROUND

1. Field of Invention

The present invention pertains to a kitchen utensil used in the preparation of garlic for cooking. Specifically, it relates to the common kitchen garlic press.

2. Description of Prior Art

A common kitchen garlic press is constructed of a garlic chamber with a perforated sieve member in the bottom located near a hinge which joints two lever arms. The top lever arm operates a plunger which moves vertically within the chamber to squeeze garlic through the perforations. There are numerous existing patents for this type of garlic press with each one a minor variation of this fundamental design. Examples of these can be found in Lackie U.S. Pat. Nos. 5,370,044, Gibson 5,463,941, and Laib 5,467,699, etc.

In this type of garlic press, each clove of garlic should first be pre-peeled to avoid the peelings blocking the perforations. Then substantial pressure is required to force the closing of the two levers to squeeze on the clove of garlic.

There are several commonly recognized problems with garlic tools of this design:
1) Difficulty in use—requires pre-peeling of garlic cloves and strong wrist strength in pressing;
2) Substantial wastage—garlic bits remain in the chamber and perforations;
3) Pulverized garlic bits—may not be desirable for the intended use;
4) Difficulty in Cleaning—compressed garlic bits tend to get stuck in perforations and crevices.
5) Inadvertent garlic juice spray There are several garlic tools on the market that attempts to alleviate the problem of difficult garlic pressing by having longer and bigger lever arms or with soft handles. Petronelli U.S. Pat. No. 4,582,265 presented a somewhat different approach by having a rotatable plunger with patterns on the plunger surface so that the garlic clove can be ground into finer particles before forced out of the perforations on the sieve member. Other existing patents specifically attempt to deal with the very real and undesirable cleaning problem by providing special cleaning device, or special non-stick surface such as presented by Ancona U.S. Pat. Nos. 5,520,104, Short et al. 6,237,474 and Moor 5,513,562, etc.

Such extraordinary efforts at improvement, however, only succeed at best in alleviating some of the noted disadvantages. So long as a garlic press retains the traditional two-lever, perforated sieve chamber design, all of the above-mentioned five problems clearly remain, if to a varying degree.

Other inventors also recognize such problems and attempts were made to design garlic tools that can overcome such shortcomings. These following patents, Repac and Culig U.S. Pat. Nos. 5,947,016, Bigelow et al 6,244,529, Holcomb 4,537,123, a UK design patent 2039383, and an Australian reg.des. No. 114662 (also registered as UK reg. Des. No. 2,013,169) presented different cutters or graters that do not follow the traditional two lever, perforated sieve chamber design. Although such devices appear to be satisfactory for their designed purposes, since the devices have many separate parts, they are unnecessarily bulky, complicated, slow to operate, and have high production costs.

The above mentioned types of utensils tools represent almost all of the known kitchen garlic tools or the garlic presses. A common feature among all of them is that the processed garlic is forced to pass through multiple perforations on either a grater plate with raised tiny sharp cutting edges, or through a sieve member.

A different class of kitchen utensil that is not designed specifically for garlic preparation but nevertheless can be used for such purpose is the kitchen chopper. This can be in the shape of a cylindrical container about the size of a beaker having a vertically traveling member with attached cutter blades at its bottom. The traveling member is held up as its normal resting position by a spring means. The vertically traveling member can pressed down by hand chopping the material resting on the bottom of the container into fine bits. Another popular kitchen chopper most commonly used to prepare salsa has a pair of rotating blades inside a container. The material resting on the bottom is chopped up by cranking a handle on the top of the container rotating the chopping blades.

The main problem of using such kitchen choppers for garlic preparation is that they occupy a large space, they contain many parts and are expensive, processed garlic bits are difficult to gather etc. Simply put, they represent unwarranted overkill for the purpose of garlic preparation, with a result that is less than satisfactory.

A survey of the available cook books reveals that few cook book authors advocate the use of the commonly available garlic presses for garlic preparation presumably because of the problems previously mentioned. But instead, they provide detail instructions in how to properly prepare garlic cloves by using a kitchen knife, or pre-boiling, or pre-baking of the garlic clove. Unfortunately, all such efforts are either complicated requiring much skill and practice, or are slow and energy inefficient. All in all, garlic preparation in the kitchen has always been a slow, difficult, unpleasant, and daunting task.

OBJECTS AND ADVANTAGES

With the innovative, completely new design presented by this invention, all above mentioned disadvantages associated with a common kitchen garlic press are eliminated:

It is a first objective of this invention to provide a tool that would peel, press, and grate garlic or other edibles such as ginger, herbs, medical pills etc. with minimal effort.

It is a second objective of this invention to provide a tool that can efficiently accomplish said functions with negligible wastage and is easy to clean.

It is another objective of this invention to provide a tool that is simple, compact and esthetically-pleasing besides being highly functional.

Additional advantages from a manufacturer's standpoint include: a highly innovative product that is far superior to other competitive products on the market in every aspect and is extremely simple and economical to produce.

Other objects of the invention will in part be obvious and will in part appear hereinafter.

The invention accordingly comprise the device possessing the features, properties, and the relation of components which are exemplified in the following detailed disclosure and the scope of the application of which will be indicated in the appended claims.

For a fuller understanding of the nature and objects of the invention reference should be made to the following detailed description, taken in the accompanying drawings.

BRIEF SUMMARY OF THE INVENTION

In accordance with the present invention a simple garlic processing tool comprises a set of two disc-shaped presser units having opposite-facing rotary grating means. Unpeeled garlic cloves are placed between the rotary grating means whereby they are pressed, peeled, and grated by hand-applied counter-twisting force. Grating can be precisely controlled as the user can continuously visually monitor the process for repeated grating until desired bit size and texture is reached. This device is particularly noted for its simplicity and elegant form-follows-function design and its complete functionality as a garlic processing tool.

BRIEF DESCRIPTION OF THE FIGURES

(FIGS. 2a-c: Relative positioning of the rows of protruding grater elements)

DETAILED DESCRIPTION OF THE INVENTION (PREFERRED EMBODIMENT)

Figure 1:
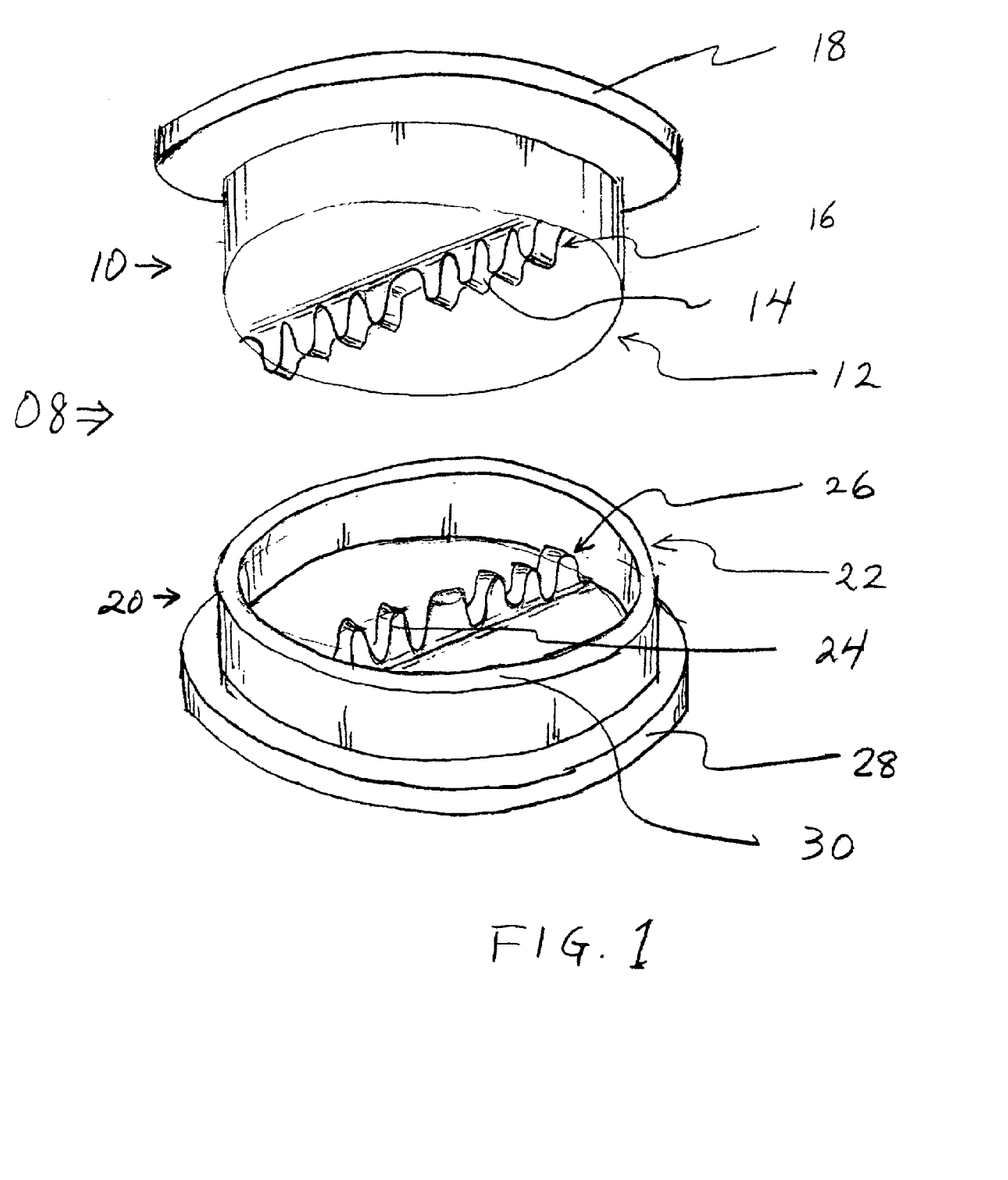
FIG. 1 Perspective view of the preferred embodiment of the garlic tool according to the invention.

A typical and preferred embodiment of the garlic tool of this invention is illustrated in FIG. 1. A two-piece set of garlic utensil tool 08 is constructed of a suitable material sufficiently hard to press and grate a clove of fresh garlic without permanent deformation such as plastic, metal, ceramic, glass etc. A transparent plastic such as acrylic or polycarbonate is particularly suitable because such materials are attractive, and the processing can be visually monitored externally for precise peeling and grating.

The utensil tool consists of two opposite-facing, disc-shaped presser units:

1) a male presser unit 10 that has a protuberant male rotary grating means 12 comprising a plurality of protruding grater elements 14 forming a grating row 16 located on the male rotary grating means; and a circular gripping edge 18;

2) a female presser unit 20 that has a sunken female grating means 22 comprising a plurality of protruding grater elements 24 forming a grating row 26 located on the female rotary grating means; a circular gripping edge 28, and a circular receptacle 30.

The gripping edges 18 and 28 provide a convenient means for the respective left hand and right hand gripping of the presser units. The gripping edge should preferably be circular in shape, but other shapes such as square, octagonal etc. would also work as long as the shape fits in human hands comfortably for gripping. The width of the gripping edges should be wider than the external diameter of the circular receptacle on the female rotary grating means and be located on the two sides of the receptacle (see FIG. 1). The protruding gripping edges would thus help the fingers to avoid coming in contact with the female receptacle when the presser units are being handled by the two hands of a user. A compression and counter-twisting force can then be applied onto the presser units to press, peel, and grate the garlic clove.

The circular receptacle 30 on the female presser unit serves several important functions:

It retains the raw garlic cloves pending processing;

it has an internal diameter of dimension slightly bigger than that of the diameter of the male rotary grating means so it can serve as a receptacle for the male rotary grating means to be freely inserted to mate with the female grating means for processing the garlic clove;

it allows the two presser units to be freely rotated against each other around a common axis to loosen the garlic skin and grate the pressed garlic;

the circular receptacle 30 sets a maximum depth that the male grating means can be inserted into the female grating means preventing damage to the protruding grater element rows 14 and 24; this maximum depth would help determine if the two rows of protruding grater elements are intermingled (or interlocked), or appositional (or opposite-facing). Also see discussion on FIG. 2 to follow;

lastly it provides an enclosure for a short term storage of processed garlic.

By arranging the protruding grater elements in two separate rows on the respective male and female grating means, they would function as two sets of grating "teeth" that works jointly to accomplish peeling of the garlic skin and grating of the garlic clove.

FIG. 2a shows a cross sectional view of the garlic tool showing the preferred embodiment of having two rows of protruding grater elements that are intermingled (or interlocked) at the maximum insertion of the male grating means. In this embodiment, it can be seen that when the two rows are rotated to align with each other, any material that is caught between the two rows of protruding grater elements will be grated into bits the size of the distance between each adjacent grater elements on the same row. Note the protruding grater elements on the male grating means can reach all the way to the bottom of the protruding grater elements on the female grating means in this intermingled (or interlocked) design. It can be seen that if the male grating means is fully inserted, then no material will be left ungrated after the presser units have made a half turn rotation against each other.

FIG. 2b shows a cross sectional view of the garlic tool showing an alternative embodiment of having two rows of protruding grater elements that are appositional (or opposite-facing) at the maximum insertion of the male grating means. In this embodiment, it can be seen that the protruding grater elements on the male grating means do not reach all the way to the bottom of the female presser unit regardless of its rotational position relative to that of the female grating means. So there is some space there that garlic bits can remain without being swiped by the revolving appositional (or opposite-facing) rows of protruding grater elements regardless of how the presser units are pressed or rotated.

FIG. 2c shows a top schematic view of the circular tracks made by the intermingled (or interlocked) rows of protruding grater elements at the maximum insertion of the male grating means when they are aligned as they freely revolve relative to each other. It can be seen that the garlic clove placed anywhere within the sweeping path would be grated by the two closing rows of protruding grater elements.

Note if the protruding grater elements are in a set spread over the surface of either the male or the female rotary grating means, they may not have to be aligned when they become intermingled. But when they are disposed in rows, the rows should then be first aligned when intermingling or interlocking occurs.

Figure 3:
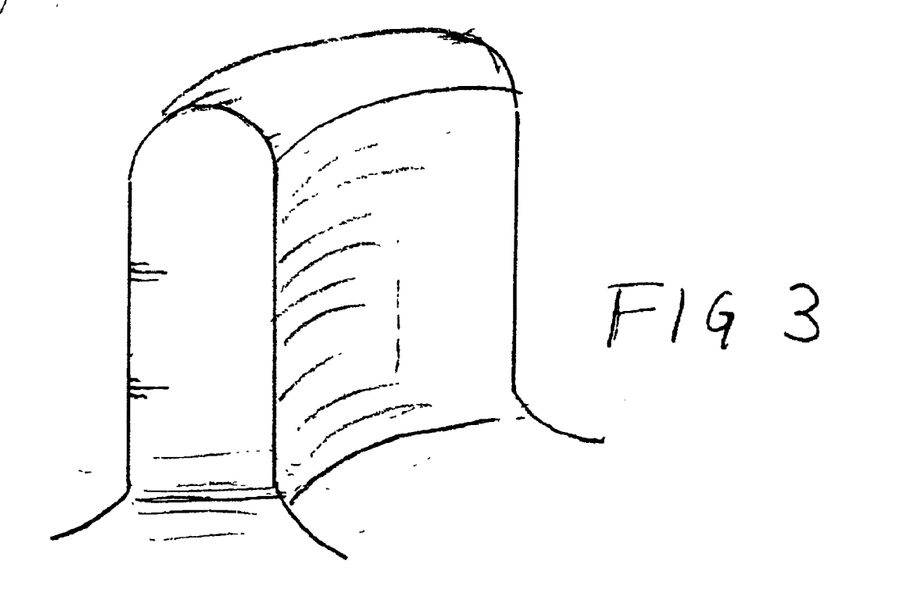

FIG. 3 shows a close-up perspective view of the preferred embodiment of a protruding grater element. It has a relatively sharp 90 degree angle at the top of its front and back ends for efficient grating. It has gentle round corners elsewhere to prevent garlic bits to be caught in crevices so they can be easily gathered. This would also allow the garlic tool to be easily rinsed clean after use. Some bending or curvature of the element is shown in the figure. It can be seen that for as long as the element has a certain length, it would be necessary to have a definite curvature so the two separate sets of interlocking grater elements can rotate against each other when aligned without interference from each other. So the curvature would be more pronounced for elements closer to the center. At the very center, one element row would have a nipple and the other element row would have a matching circular void as show in FIG. 1.

In the preferred embodiment, the protruding grater element is an integral part of the presser unit and is made of the same material such as acrylic or polcarbonate. Thus the individual protruding elements should be made sizable for robustness. If the protruding grater elements are made of a metal such as stainless steel, then its size requirement would be lessened. So the grater elements can be adequately made of stainless steel pins of an appropriate height.

In the preferred embodiment, the grater elements on both the male and female grating means in the preferred embodiment are basically similar to each other individually with only slight variations. The grater elements can also be different from each other. Variations in designs for the protruding grater elements, however, can affect the bit size, grating efficiency, and the ease of cleaning.

When a clove of garlic is put between the male and female presser units, the user can then apply a counter-twisting and compression force on the presser units by hand-gripping the two presser units at the gripping edges. The two counter-revolving rows of protruding grater elements on the presser units act as two pairs of rakes rotating in opposite directions swiping the pressed garlic. Slippage of the garlic between the two grating means is prevented. In the preferred embodiment, the pressed garlic is grated as the two intermingled rows of protruding grater elements is rotated to close in on each other finally passing through each other thus grating the pressed garlic into fine bits about the size of the width of each protruding grater element.

The pressed garlic can be repeatedly grated by simply rotating the presser units more turns. Since the user can visually monitor the garlic clove through the transparent presser units while it is being processed, the grating of the garlic clove can be precisely controlled for optimum bit size and texture.

After the garlic is properly grated, if the user first align the two rows of protruding grater elements together, and then slightly twist one presser units back-and-forth against the other in a finite swinging angle (less than 45 degrees on either side of the other row), the garlic bits will become collected neatly in two pie-shaped piles in the space away from the grating rows. This would enable the garlic bits to be easily scooped out for use and the presser units to be easily rinsed clean.

Figure 4A:
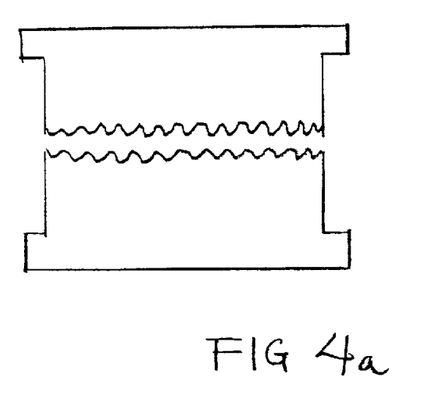
FIG. 4a: Basic design of the garlic tool having a set of two presser units

FIG. 4 shows several different embodiments of the same invention:

FIG. 4a shows a basic design of this invention with just two simple presser units having their respective grating means. All other embodiments are variations of this basic design.

Figure 4B:
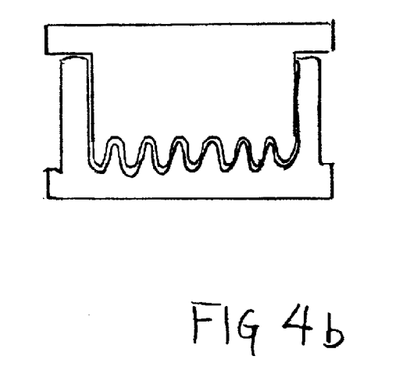
FIG. 4b: Preferred embodiment of the garlic tool (same as shown in FIG. 1)

FIG. 4b shows a preferred embodiment of the garlic tool. This is a repeat of FIG. 1 for comparison with the other embodiments.

Figure 4C:
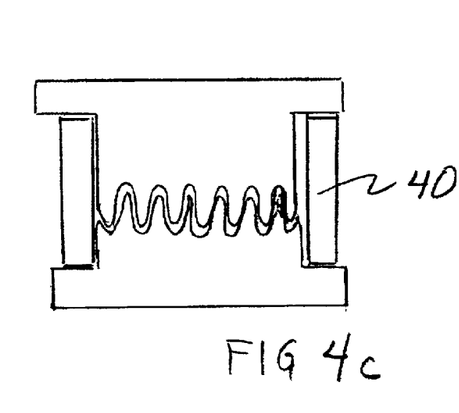
FIG. 4c: A three-piece garlic tool with the addition of a tubular middle ring

FIG. 4c shows a design having a tubular middle ring 40 that performs the same function as the circular receptacle 30 of the female presser unit in FIG. 1.

Figure 4D:
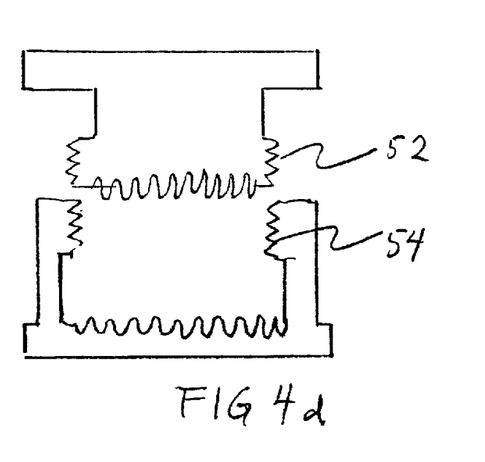
FIG. 4d: A garlic tool with screw threads as an aid in garlic pressing (FIGS. 5a-b: Possible grating surface designs)

FIG. 4d shows a garlic tool with internal screw threads that provide a twisting torque as an alternative means to apply a vertical force to press the garlic. Another closely related embodiment of this design is to have the screw threads located external to the presser units.

Figure 5A:
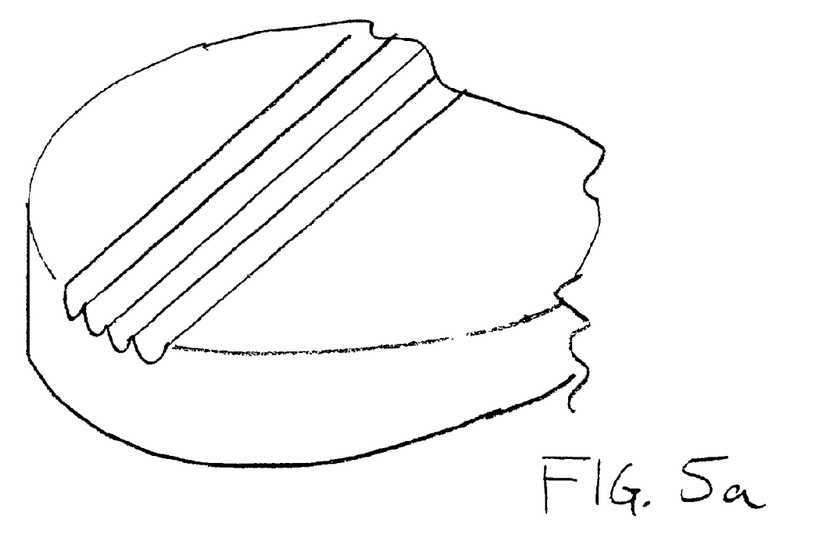
FIG. 5a: A laundry board design

FIG. 5a shows a "laundry board" parallel groves surface grating pattern design for the opposite-facing male and female rotary grating means on the presser units. Other possible surface grating designs include spiral groves, "waffle" or diamond patterns etc. Any surface grating pattern design can accomplish pressing of garlic if the presser units are sufficiently manipulated and sufficient force is applied. The grating of garlic theoretically can be done by vigorous twisting and forcing the two presser units together. However, if pure surface grating patterns are employed as the only means for grating, then this operation is generally unsatisfactory at best. This is because pressed garlic has a tendency to slip between the two presser units regardless of the surface pattern making proper grating difficult or impossible to achieve. This problem is even more pronounced if the garlic cloves are not first pre-peeled.

Figure 5B:
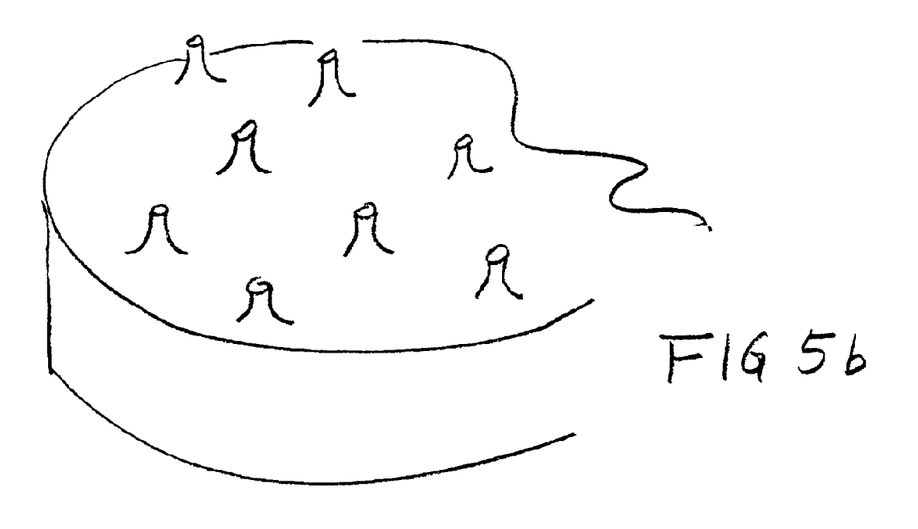
FIG. 5b: A protruding or raised dot design

FIG. 5b shows the type of rotary grating means having a type of protruding grater elements "raised dots" that can overcome garlic slippage. Considerably better results can be achieved by using either the intermingled or appositional raised dots for the male and female rotary grating means because the garlic cloves can be better gripped and swiped along for grating without slippage.

One problem of having raised dots interspersed all over the surface of the male and female grating means is that the processed garlic bits tend to accumulate around the many raised dots making it difficult to gather the processed garlic.

A improved version of this raised dot design is to arrange the raised dots, or otherwise termed the protruding grater elements, in a single row across the axis of rotation of both the male and female interior grating surfaces as shown in FIG. 1 in the preferred embodiment. So having the protruding grater elements arranged in an orderly row would make it easier to gather the grated garlic bits as well as would make it easier to clean the presser units after use.

The protruding grater elements rows can be arranged in:

a short row extending outward from the respective centers of the male and female grating means. A single short row of grater elements would mean non-optimized grating efficiency a longer row from one side of the respective male and female grating means to the opposite side encompassing their respective centers; or looking at it slightly differently, in two short rows 180 degrees apart extending outward from their respective centers. This is the preferred embodiment shown in FIG. 1.

"Y"-shaped arrangement representing three short rows of grater elements 120 degrees apart, extending outward from the respective centers of the two presser units.

With the protruding grater elements rows, the rest of the grating surface can be either left plain, or have other surface grating pattern designs incorporated as further aid in garlic processing.

This invention is unique in its being the only garlic tool that has the theoretical minimum possible number of parts— two presser units; and the only garlic tool (other than kitchen choppers) that does not force processed garlic through predetermined perforations on a grating or sieve member. This invention is also unique in being the only one that would allow repeated grating in conjunction with continuous visual monitoring enabling precise garlic processing control for optimum bit size and texture.

| Reference Numerals in Drawings | |
| --- | --- |
| 08 | garlic tool |

(Parts with numberings in the 10's are associated with the male presser unit.)

| | |
| --- | --- |
| 10 | male presser unit |
| 12 | rotary male grating means |
| 14 | protruding grater element |
| 16 | grater element row |
| 18 | gripping edge |

(Parts with numberings in the 20's are associated with the female presser unit)

| | |
| --- | --- |
| 20 | female presser unit |
| 22 | rotary female grating means |
| 24 | protruding grater element |
| 26 | grater element row |
| 28 | gripping edge |
| 30 | circular receptacle |
| 40 | tubular middle ring |
| 52 | Male screw threads |
| 54 | Female screw threads |

Operation and Utilization

The operation of the garlic tool is simply accomplished by the following steps:

1) Place an unpeeled clove of fresh garlic or multiple garlic cloves between the presser units.

2) Close the two presser units together by inserting the male presser unit into the female presser unit.

3) While maintaining a compression force by using both hands, counter-twist the two presser units. Visually observe the opposite revolving rows of grater elements peeling the garlic skin until it is all loosened. (Visual monitoring of the entire processing is possible since the garlic tool is made of transparent plastic.)

4) Open the presser units and discard peeled garlic skin.

5) Close the presser units again and resume repeated counter-twisting action. Visually confirm that proper grating is achieved.

6) Before opening the presser units, align the two grater element rows, then twist the two presser units in a slight back-and forth motion against each other in a finite angle (less than 45 degrees on either side of each other). This would force the grated garlic bits to gather in two neat quadrant or pie-shaped piles in the space away from the two grater element rows allowing easy access for use in cooking.

Note:

a) Alternatively the garlic can be pre-pressed after step 2 by first stacking the presser units with one on top of the other and then leaning one's weight on them so as to crush the garlic and loosen the garlic skin.

b) Regardless of whether or not the garlic is first pre-pressed, the peeling and grating of garlic can still be effectively done because the grater element rows actually starts working as soon as they come in contact with the surface of the garlic clove and a counter-twisting and compression force is applied to the presser units by hand.

c) In the alternative embodiment shown in FIG. 4c, the vertical force is applied by twisting the male presser unit into the female presser unit via the screw threads. Except as noted, the operation of this alternative embodiment is the same as above.

CONCLUSION, RAMIFICATIONS, AND SCOPE OF INVENTION

Thus the reader will see that the garlic tool of the invention provides a simple, inexpensive, easy to operate and clean, compact and elegant device that is vastly superior to the common garlic press of the familiar two handle, perforated sieve design.

While my above description contains many specificities, these should not be construed as limitations on the scope of the invention, but rather as an exemplification of one preferred embodiment thereof. Many other variations are possible. For example, the exterior shape of the presser units can be square, or octagonal; the presser units can be made with non-transparent material such as aluminum (although losing the advantage that the garlic can be viewed as it is being processed); many other forms of the rotary grating means can be possible; and lastly the same two presser units can be adopted for use in automatic garlic processing device, etc.

Accordingly, the scope of the invention should be determined not by the embodiments illustrated, but by the appended claims and their legal equivalents.

What is claimed is:

1. A utensil tool sized to fit in a human hand for processing of edibles comprising:

a) a first presser unit comprising a first rotary grazing means, b) a second presser unit comprising a second rotary grating means, wherein said first rotary grating means comprises a protuberant rotary male grating means, and said second rotary grating means comprises a sunken rotary female grating means, further including a circular receptacle means; said male grating means sized slightly smaller than said circular receptacle means whereby said male grating means can be inserted to rotatably mate with said female grating means.

2. The utensil tool of claim 1, said first presser unit further including a first gripping edge sized wider than the external diameter of said circular receptacle means; and said second presser unit further including a second gripping edge sized wider than the external diameter of said circular receptacle means.

3. The utensil tool of claim 1, wherein said male grating means and said female grating means comprise of a predetermined surface grating pattern.

4. The utensil tool of claim 1, wherein said male grating means comprises a first set of spaced-apart protruding grater elements and said female grating means comprises a second set of spaced-apart protruding grater elements.

5. The utensil tool of claim 4, wherein said two sets of protruding grater elements are intermingled at the maximum insertion of said male grating means into said circular receptacle means.

6. The utensil tool of claim 5, wherein said first set of protruding grater elements are arranged in two rows, 180 degrees apart, extending outward from the center of said male grating means; and said second set of protruding grater elements are arranged in two rows, 180 degrees apart, extending outward from the center of said female grating means.

7. The utensil tool of claim 5, wherein said first set of protruding grater elements are arranged in three rows, 120 degrees apart, extending outward from the center of said male grating means, and said second set of protruding grazer elements are arranged in three rows, 120 degrees apart, extending outward from the center of said female grating means.

8. The utensil tool of claim 1, wherein said presser units are made of molded transparent plastic.

9. The utensil tool of claim 1, wherein said presser units form a hockey puck disc shape when in a closed position.

10. The utensil tool of claim 1, wherein said first presser unit and said second presser unit have matching screw threads whereby said first presser units will be rotatably matched with said second presser unit,
and wherein said matching screw threads are internal to said utensil tool when in a closed position.

11. The utensil tool of claim 1, wherein said first presser unit
and said second presser unit have matching screw threads whereby said first presser units will be rotatably mated with said second presser unit,
wherein said matching screw threads are external to said utensil tool when in a closed position.

12. The utensil tool of claim 1, further including a tubular middle ring having an inner diameter sized slightly larger than said first and second rotary grating means.

13. A utensil tool sized to fit in a human hand for processing of edibles comprising:
a) a first presser unit comprising a protuberant male rotary grating means and a first set of spaced-apart protruding grater elements;
b) a second presser unit comprising a sunken female rotary grating means having a circular receptacle means and a second set of spaced-apart protruding grater elements;
c) wherein said first set of grater elements are intermingled with said second set of grater elements at the maximum insertion of said male rotary grating means into said circular receptacle;
and wherein said sets of grater elements are disposed in two rows, 180 degrees apart, extending outwardly from the center of said male and female rotary grating means, whereby edibles will be pressed and grated between said first and second rotary grating means.

14. A utensil tool sized to fit in a human hand for processing of edibles comprising:
a) a first presser unit comprising a protuberant male rotary grating means and a first set of spaced-apart protruding grater elements;
b) a second presser unit comprising a sunken female rotary grating means having a circular receptacle means and a second set of spaced-apart protruding grater elements;
c) wherein said first set of grater elements are intermingled with said second set of grater elements at the maximum insertion of said male rotary grating means into said circular receptacle;
and wherein said sets of grater elements are disposed in three rows, 120 degrees apart, extending outward from the center of said male and female rotary grating means, whereby edibles will be pressed and grated between said first and second rotary grating means.

15. A palm-sized rotary kitchen tool of at least two pieces suitable for processing of garlic, comprising male and female presser units that are configured to be joined in a mating relationship that supports rotary movement of said male presser unit within said female presser unit and defines a cylindrical grating chamber of sufficient volume to retain at least one garlic clove therein when said male presser unit is fully received within said female presser unit, said male and female presser units comprising respective grating teeth that are configured to define a plurality of substantially equivalent volumes being free of grating teeth when said respective grating teeth of said male and female presser units are aligned to each other wherein said female presser unit comprises a circular receptacle; and wherein a circumference of said grating chamber is equivalent to an inner circumference of said circular receptacle, and wherein said male presser unit further comprises a gripping edge having its width being wider than an outer width of said circular receptacle; and wherein said circular receptacle abuts said gripping edge when said male presser unit is fully received within said female presser unit.

16. A palm-sized rotary kitchen tool of at least two pieces suitable for processing of garlic, comprising male and female presser units that are configured to be joined in a mating relationship that supports rotary movement of said male presser unit within said female presser unit and defines a cylindrical grating chamber of sufficient volume to retain at least one garlic clove therein when said male presser unit is fully received within said female presser unit, said male and female presser units comprising respective grating teeth that are configured to define a plurality of substantially equivalent volumes being free of grating teeth when said respective grating teeth of said male and female presser units are aligned to each other wherein said male presser unit comprises a cylindrically shaped protuberant rotary grating member having a circular face thereon and wherein said grating teeth on said male presser unit are spaced apart in a single row on said circular face and span a diameter of said circular face.

17. The tool of claim 16, wherein said female presser unit comprises a cylindrical shaped sunken receptacle having a circular bottom thereon; and wherein said grating teeth on said female presser unit are spaced apart in a single row on said circular bottom and span a diameter of said circular bottom.

18. The tool of claim 17, wherein the number of grating teeth on said male presser unit differs from the number of grating teeth on said female presser unit by one; said grating teeth further including one central protruding element.

* * * * *

UNITED STATES PATENT AND TRADEMARK OFFICE
CERTIFICATE OF CORRECTION

Figure 2:
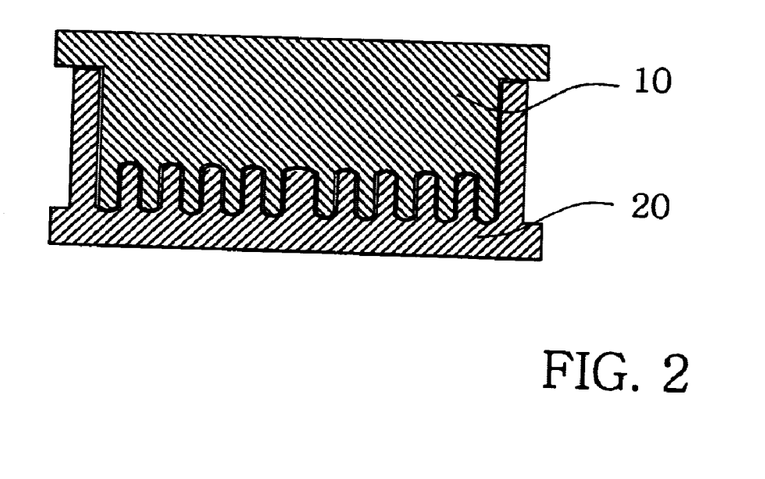
Figure 2A:
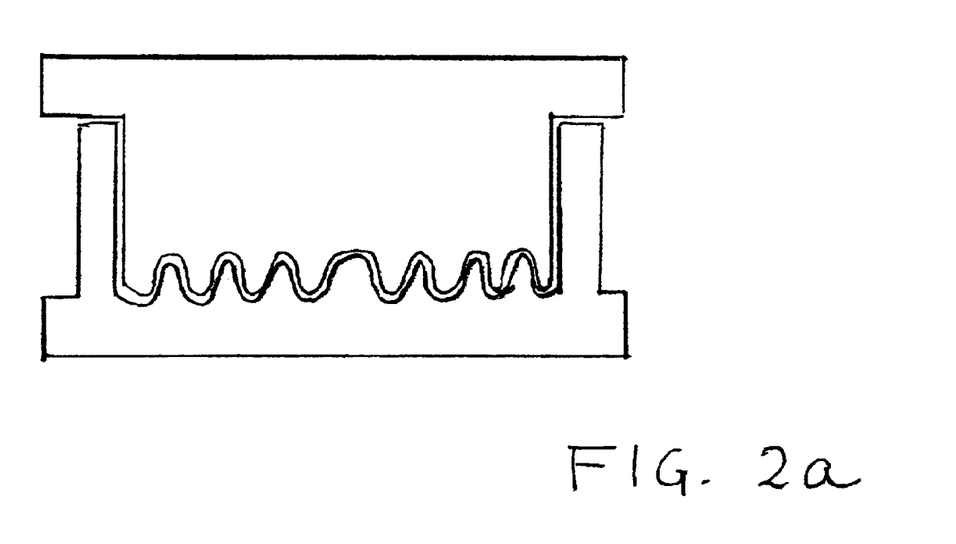
FIG. 2a Side cross sectional view showing the relative positioning of the intermingled (or interlocked) rows as they become aligned FIG. 2b Side cross sectional view showing the relative positioning of the appositional (or opposite-facing) rows as they become aligned FIG. 2c Top schematic view showing the relative positioning of the intermingled (or interlocked) rows as the presser units are being rotated FIG. 3 Close-up view of the preferred embodiment of a single protruding grater element (FIGS. 4a-d: Simplified cross sectional view of examples of possible embodiments)
Figure 2B:
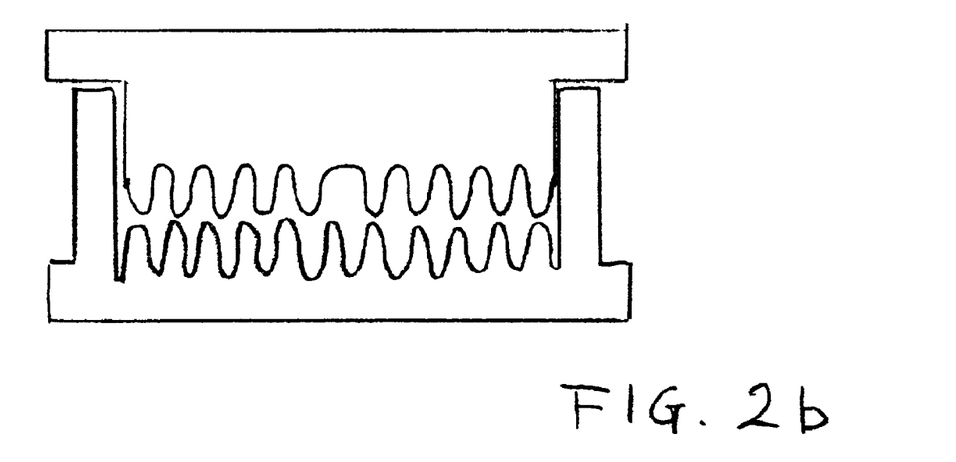
Figure 2C:
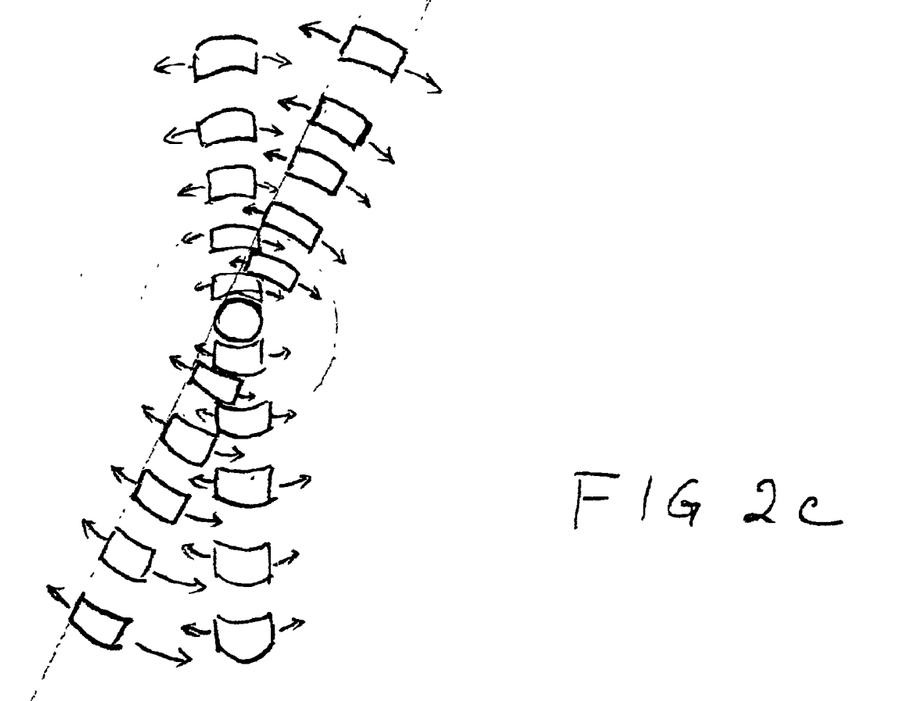

PATENT NO.    : 6,945,486 B2
DATED         : September 20, 2005
INVENTOR(S)   : Eric Y. Teng It is certified that error appears in the above-identified patent and that said Letters Patent is hereby corrected as shown below:

<u>Drawings,</u>
Delete Figs. 1-3 and substitute with Figs. 1-3 as shown on the attached pages.

Signed and Sealed this

Thirteenth Day of June, 2006

JON W. DUDAS
*Director of the United States Patent and Trademark Office*

UNITED STATES PATENT AND TRADEMARK OFFICE
CERTIFICATE OF CORRECTION

PATENT NO. : 6,945,486 B2
APPLICATION NO. : 09/949310
DATED : September 20, 2005
INVENTOR(S) : Eric Y. Teng It is certified that error appears in the above-identified patent and that said Letters Patent is hereby corrected as shown below:

Delete the title page and substitute therefor the attached title page.

<u>Drawings,</u>
Delete Drawing Sheets 1-5 and substitute therefore the attached Drawing Sheets 1-2.

This certificate supersedes Certificate of Correction issued June 13, 2006.

Signed and Sealed this

Seventh Day of November, 2006

JON W. DUDAS
*Director of the United States Patent and Trademark Office*

United States Patent
Teng (10) Patent No.: US 6,945,486 B2
(45) Date of Patent: Sep. 20, 2005

(54) ROTARY KITCHEN GARLIC TOOL

(76) Inventor: Eric Y. Teng, 12089 Gold Pointe La., Gold River, CA (US) 95670

(*) Notice: Subject to any disclaimer, the term of this patent is extended or adjusted under 35 U.S.C. 154(b) by 0 days.

(21) Appl. No.: 09/949,310

(22) Filed: Sep. 7, 2001

(65) Prior Publication Data

US 2003/0015611 A1 Jan. 23, 2003

Related U.S. Application Data

(60) Provisional application No. 60/304,901, filed on Jul. 11, 2001.

(51) Int. Cl.$^7$ ............................................. A47J 43/25
(52) U.S. Cl. ........................ 241/169.1; 241/169.2; 241/273.2
(58) Field of Search ........................ 241/162, 164, 241/169.1, 169.2, 273.2

(56) References Cited

U.S. PATENT DOCUMENTS 795,746 A * 7/1905 Wingfield et al. ........ 241/169.1
3,581,790 A * 6/1971 Del Conte ................ 241/169.1

* cited by examiner

*Primary Examiner*—Mark Rosenbaum (57) ABSTRACT

In accordance with the present invention an innovative garlic tool consists of a set of two disc-shaped presser units having respective male and female rotary grating means comprising a row of protruding grater elements each. Unpeeled garlic cloves are placed between the rotary grating means whereby they are peeled, pressed, and grated by hand-applied counter-twisting force. Processing can be precisely controlled by continuous visual monitoring and repeated grating to achieve optimal bit size and texture. This device is truly remarkable in its complete functionality, and in its simple, compact, and elegant two piece form-follows-function design.

18 Claims, 5 Drawing Sheets